United States Patent
Catani et al.

(10) Patent No.: US 11,311,034 B2
(45) Date of Patent: Apr. 26, 2022

(54) SYNERGISTIC SWEETENING COMPOSITIONS

(71) Applicant: Heartland Consumer Products LLC, Carmel, IN (US)

(72) Inventors: Steven J. Catani, Athens, GA (US); Shyhyuan Liao, West Windsor, NJ (US)

(73) Assignee: Heartland Consumer Products, LLC, Carmel, IN (US)

( * ) Notice: Subject to any disclaimer, the term of this patent is extended or adjusted under 35 U.S.C. 154(b) by 0 days.

(21) Appl. No.: 15/606,245

(22) Filed: May 26, 2017

(65) Prior Publication Data

US 2017/0258115 A1 Sep. 14, 2017

Related U.S. Application Data

(63) Continuation of application No. 12/810,554, filed as application No. PCT/US2008/087588 on Dec. 19, 2008, now abandoned.

(60) Provisional application No. 61/016,917, filed on Dec. 27, 2007.

(51) Int. Cl.
*A23L 2/60* (2006.01)
*A23L 27/30* (2016.01)

(52) U.S. Cl.
CPC ............. *A23L 2/60* (2013.01); *A23L 27/36* (2016.08); *A23L 27/37* (2016.08); *A23V 2002/00* (2013.01)

(58) Field of Classification Search
CPC ............. A23L 2/60; A23L 27/37; A23L 37/36
See application file for complete search history.

(56) References Cited

U.S. PATENT DOCUMENTS

2007/0224323 A1 † 9/2007 Goldman

FOREIGN PATENT DOCUMENTS

| EP | 1210880 A1 † | 6/2002 |
| GB | 2098848 A1 † | 12/1981 |
| JP | 2001-161309 A1 † | 6/2001 |
| WO | 199103147 A1 † | 3/1991 |

OTHER PUBLICATIONS

Hutteau, F., "Physicochemical and Psychophysical characteristics of binary mixtures of bulk and intense sweeteners" Food Chemistry, vol. 63, No. 1, pp. 9-16, 1998.
Monda, I., "Synergistic effects of some alternative sweeteners on the unpleasant attributes of stevia sweetener and its application in some fruit drinks", Alexandria Journal of Food Science and Technology, vol. 2, No. 2, pp. 1-10, 2005.

† cited by third party

*Primary Examiner* — Katherine D Leblanc
(74) *Attorney, Agent, or Firm* — Taft Stettinius & Hollister LLP; Joseph M. Bennett-Paris

(57) ABSTRACT

A sweetening composition comprising sucralose and a purified extract of stevia.

2 Claims, No Drawings

SYNERGISTIC SWEETENING COMPOSITIONS

CROSS REFERENCE TO RELATED APPLICATION

This application is a continuation of U.S. patent application Ser. No. 12/810,554 filed Jun. 25, 2010, which is a national stage application of Patent Application No. PCT/US2008/087588 filed Dec. 19, 2008, which claims the benefit of U.S. Provisional Patent Application No. 61/016,917 filed on Dec. 27, 2007, all of which are incorporated by reference herein in their entirety.

BACKGROUND OF THE INVENTION

Field of the Invention

The present invention relates to sweetening compositions. More particularly, the present invention relates to synergistic sweetening compositions that include sucralose and purified extracts of stevia.

Related Background Art

High intensity sweeteners can provide the sweetness of sugar (although often with a slightly different taste), but because they are many times sweeter than sugar, only a small amount is needed to replace the sugar.

One high intensity sweetener is sucralose (i.e., 4,1',6'-trichloro-4,1',6'-trideoxygalactosucrose), which is about 600 times as sweet as sugar. Another is stevia, which has glycosides that are about 100 to about 500 times sweeter than sucrose.

When two or more components in a system produce a positive or negative effect above or below what is expected or predicted, there is synergy. That is, synergistic combinations of components produce results that are more effective or less effective than the predicted additive result for each component taken separately.

SUMMARY OF THE INVENTION

The present invention is directed to sweetening compositions comprising sucralose and a purified extract of stevia.

In one embodiment, the sweetening composition comprises sucralose and a purified extract of stevia selected from the group consisting of rebaudioside A, rebaudioside B, rebaudioside C, rebaudioside D, rebaudioside E, dulcoside A, dulcoside B, and combinations thereof.

In another embodiment, the sweetening composition comprises sucralose and a purified extract of stevia wherein the sweetness contribution ratio of sucralose and the purified stevia extract is about 90:10 to about 10:90, respectively.

The present invention also includes a method of making a food or beverage product comprising the step of (a) including sucralose and a purified extract of stevia.

DETAILED DESCRIPTION OF THE INVENTION

As used herein, the term "high intensity sweetener" means a substance that provides a high sweetness per unit mass compared to a nutritive sweetener and provides little or no nutritive value. Many high intensity sweeteners are known to those skilled in the art and any may be used in the present invention. Examples of high intensity sweeteners useful in the present invention include, for example, aspartame, acesulfame, alitame, brazzein, cyclamic acid, dihydrochalcones, extract of *Dioscorophyllum cumminsii*, extract of the fruit of *Pentadiplandra brazzeana*, glycyrrhizin, hernandulcin, monellin, mogroside, neotame, neohesperidin, saccharin, sucralose, extracts of sweet plants, such as stevia, thaumatin, salts, and combinations thereof.

As used herein, unless otherwise indicated, the term "flavor" means any food-grade material that may be added to the present compositions to provide a desired flavor to a foodstuff. Non-limiting examples of flavors that may be useful in the present invention include, for example, cream, hazelnut, vanilla, chocolate, cinnamon, pecan, lemon, lime, raspberry, peach, mango, vanillin, butter, butterscotch, tea, orange, tangerine, caramel, strawberry, banana, grape, plum, cherry, blueberry, pineapple, elderberry, watermelon, bubblegum, cantaloupe, guava, kiwi, papaya, coconut, mint, spearmint, derivatives, and combinations thereof.

As used herein, a gram (or other given amount) of Sucrose Equivalent Sweetness ("SES") means the amount of high intensity sweetener needed to be added to an 8 ounce glass of water in order to provide the same sweetness as an independent 8 ounce glass of water containing one gram (or the other given amount) of sucrose. For example, 1/200 g of aspartame will equal about one gram of SES because aspartame is about 200 times sweeter than sucrose. Similarly, about 1/500 g to about 1/600 g of sucralose will provide one gram of SES because sucralose is about 500 to about 600 times sweeter than sucrose.

The present invention is directed to a sweetening composition comprising sucralose and a purified extract of stevia.

In one embodiment, the sucralose and purified extract of stevia are present in a sweetening combination ratio (sucralose:purified extract of stevia) of about 90:10 to about 10:90. Preferably, the sweetening combination ratio is about 80:20 to about 20:80, more preferably, about 70:30 to about 30:70.

Sucralose, which is also known as 4,1,6'-trideoxy-galactosucrose, is a heat-stable, high-intensity sweetener that may be produced in accordance with the process disclosed in U.K. Patent No. 1,543,167, and U.S. Pat. Nos. 5,136,031 and 5,498,709, which are incorporated by reference herein.

Stevia is a non-caloric natural sweetener from the plant *Stevia rebaudiana bertoni*. The plant makes a number of sweet compounds collectively referred to as steviol glycosides, which make stevia 300 times sweeter than sucrose. These glycosides can be extracted from the plant with water and other solvents well known to those skilled in the art. They are heat stable, pH stable, do not ferment, and do not induce a glycemic response.

Stevioside, sometimes referred to as stevia, (13-[(2-O-β-D-glucopyranosyl)oxy]-kaur-16-en-18-oic acid-4α-β-D-glucopyranosyl ester) and rebaudioside A are exemplary glycosides of the diterpene derivative steviol, extracted and refined from *Stevia rebaudiana bertoni* (also known as *Eupatorium rebaudianum bertoni*) leaves. These glycosides are high intensity sweeteners, about 100 to about 500 times that of sucrose, but have metallic and bitter notes. They can be used in a wide range of low or reduced calorie food products and beverages.

Other sweet glycosides can also be extracted from *Stevia rebaudiana*. These have varying degrees of sweetness. As used herein "stevia extract" or "extracts of stevia" means a sweet glycoside extracted from a stevia plant. Stevia extracts include, for example, rebaudioside A, rebaudioside B, rebaudioside C, rebaudioside D, rebaudioside E, dulcoside A and dulcoside B. These extracts or combinations thereof are suitable for use in the inventive sweetening composition.

Preferably, the extracts of stevia are purified to select or exclude extract or combinations of extracts. It is desirable that the purity of the extract be about 40-100% pure, preferably about 60-95% pure, and more preferably about 70-90% pure.

In one preferred embodiment, the extract of stevia is rebaudioside A.

For example, the synergistic composition may include rebaudioside A ranging from about 40% to about 100%. Preferably, from about 60% to about 95%.

In an alternative embodiment, the extract of stevia has a low level of rebaudiosides and dulcosides. Preferably, less than about 50% of the stevia extract includes rebaudiosides and dulcosides. More preferably, less than about 40%, even more preferably, less than about 30%, still even more preferably, less than about 20%, still even more preferably, less than about 10%, still even more preferably, less than about 5%, still even more preferably, less than about 2%, and most preferably, less than about 1%.

For example, the synergistic composition may have low rebaudiosides/dulcosides in a purity ranging from less than about 50%, or preferably, less than about 40%.

Of the glycosides found in stevia extracts, rebaudioside A is known to have the least aftertaste. This aftertaste described by many as bitter and licorice like, which is present in all current stevia extracts.

Optionally, a bulking agent may be included. Among those disclosed or used include fructooligosaccharide (FOS) and other fibers, maltodextrins, and erythritol. Erythritol is especially popular as it can mitigate some of the bitter taste.

Studies performed showed that the combination of sucralose and a purified stevia extract produces a synergistic sweetening composition. That is, the present inventors have found that sweetening blends of sucralose and purified stevia extracts, produce synergistic sweetness results.

Sucralose and purified extracts of stevia were combined in various blends. In one embodiment, sucralose and stevia RA90 (purified rebaudioside A, 90%) were blended together in the following sweetening ratios (sucralose:stevia RA90): 90:10; 80:20; and 30:70.

The 90:10 and 80:20 synergy values were determined using bench top estimates for the SEV and 5.13% equisweet to sucrose values for sucralose (526.3 and 0.0095%) and A90 stevia (270 and 0.0211%).

The 30:70 sucralose: RA90 stevia synergy trials exhibited a higher percentage of synergy (about 27.00%-28.68%) than the 90:10 (about 7.49%-8.43%) or 80:20 (about 9.13%-11.10%) sucralose: RA90 stevia synergy trials.

The 90:10 ratio of sucralose:low RC and DA stevia exhibited no observed synergy resulting in an approximately equisweet rating to the sucralose control. The 30:70 ratio of sucralose:low RC and DA stevia resulted in about 24.167%-25.160% synergy. Thus, there may be synergy between other ratios of sucralose:low RC and DA stevia.

Additionally, a variety of ingredients may be included in the sweetening composition of the present invention.

Suitable "heat-stable, high-intensity sweeteners" include chemical compounds or mixtures of compounds which elicit a sweet taste at least five times sweeter than sucrose, as measured in accordance with the test method described in G.B. Patent No. 1,543,167, which is incorporated by reference herein. Typically, such sweeteners are substantially free from degradants after being heated for about one hour at about 40° C. Examples of such suitable sweeteners include, but are not limited to, neotame, saccharin, acesulfame-K, cyclamate, neohesperdine DC, thavmatin, brazzein, aspartame, and mixtures thereof.

High intensity sweeteners are well known alternatives to nutritive sweeteners. They provide sweetness without the calories and other metabolic impacts of the nutritive sweeteners. In many cases, high intensity sweeteners provide a sweet flavor that is preferred to nutritive sweeteners. Some high intensity sweeteners, such as, aspartame, are nutritive, but are so intense that they still provide negligible calories because very small amounts are required. Other high intensity sweeteners, such as, for example, sucralose, are not absorbed when ingested and are, therefore, non-nutritive sweeteners.

Often the makers or users of these sweeteners add other components to them to overcome a less pleasant taste, e.g., a bitter taste. For example, cream of tartar may be added to saccharin to offset its bitterness; and 2,4-dihydroxybenzoic acid may be added to sucralose to control lingering sweetness.

Another optional ingredient in the composition of the present invention is a soluble food ingredient. The soluble food ingredient may be, for example, a fructooligosaccharide (FOS), a digestion resistant maltodextrin (e.g., Fiber-Sol), erythritol, inulin, a sugar polymer, or any combination thereof. Preferably, the soluble food ingredient is a fiber.

Any coloring agent suitable for use in a food product may be used in the present invention and may include, but not be limited to azo dyes, quinopthalone dyes, triphenylmethane dyes, xanthene dyes, indigoid dyes, iron oxides, iron hydroxides, titanium dioxide, natural dyes, and mixtures thereof. More specifically, suitable colorants include, but are not limited to patent blue V, acid brilliant green BS, red 2G, azorubine, ponceau 4R, amaranth, D&C red 33, D&C red 22, D&C red 26, D&C red 28, D&C yellow 10, FD&C yellow 5, FD&C yellow 6, FD&C red 3, FD&C red 40, FD&C blue 1, FD&C blue 2, FD&C green 3, brilliant black BN, carbon black, iron oxide black, iron oxide red, iron oxide yellow, titanium dioxide, riboflavin, carotenes, antyhocyanines, turmeric, cochineal extract, clorophyllin, canthaxanthin, caramel, betanin, and mixtures thereof.

Vitamins and minerals may also be present.

The compositions can contain other components, including flavor, aroma, other nutritional component, binders, and mixtures thereof.

Synergistic compositions of the present invention can be made by any method known to those skilled in the art that provide homogenous even or homogeneous mixtures of the ingredients. These methods include dry blending, spray drying, agglomeration, wet granulation, compaction, co-crystallization and the like.

EXAMPLES

The following examples are provided to further illustrate the compositions and methods of the present invention. These examples are illustrative only and are not intended to limit the scope of the invention in any way.

The materials used in the Examples include:

| | |
|---|---|
| Sucrose | Domino granulated sugar |
| Sucralose | Splenda Brand Sucralose, Tate & Lyle |
| RA90 | Purified rebaudioside A, 90% Commercial source |

| | |
|---|---|
| Low R/D | Low rebaudioside and dulcoside extract Commercial source |
| Water | Crystal Rock, purified bottle water, pH 6.3 |

Samples were prepared as follows:

All sweetener samples were prepared as solutions with purified water (Crystal Rock bottled water at pH 6.3). Sweeteners and combinations were weighed out individually using a four-place scale (0.1 mg scale). The weighed sweetener was deposited into its respective beaker of stirring water one at a time. The solution was allowed to stir for five minutes at ambient temperature to ensure complete dissolution. Then, one drop of blue food coloring was added to each sweetener bulk solution and stirred for two minutes to assure that all sweetener solutions were homogeneous and uniform in appearance.

Sensory evaluation was performed as follows:

A 5% solution of sucrose (Domino granulated sugar) was used as the standard control. The concentrations of sucralose and purified rebaudioside, which were equisweet to the standard sucrose control solution, were measured by trained sensory panels using the constant stimulus paired comparison method (Principles of Sensory Evaluation of Food, Academic Press, New York).

The approximate sucrose equivalency value (SEV) and 5% equisweet to sucrose percentages for sucralose and rebaudioside were determined by bench top evaluation and confirmation with 15 trained panelists by a series of 4-6 concentrations of sweetness intensity for each sweetener so that the mid-concentration was approximately the same sweetness as the sucrose or sucralose SEV control. Coded samples were served at room temperature (20-22° C.) to panelists in pairs according to the methodology for a paired difference test. One pair was the test solution and the other pair was the sucrose control or the constant stimulus. Panelists were instructed to taste the samples in the order provided, rising between samples. Panelists would then circle the number assigned to the sample he or she found to be the sweeter sample. The results were subjected to equisweetness determination by plotting concentration versus percentage of panelists choosing the blend as sweeter than the sucrose control. SEV, the concentration at which 50% of the panelists indicated the test sweetener sample to be sweeter than the control sample was calculated. The resulting SEVs were:

| Sweetener | Intensity | SEV %, 5% sucrose |
|---|---|---|
| Sucrose | 1 | 5 |
| Sucralose | 540 | 0.0093 |
| Rebaudioside A | 220 | 0.0227 |
| Low rebaudioside and dulcoside extract | 145 | 0.0345 |

Synergy Determination:

Synergy was measured by determining the concentration of the sweetener combination having the same level of sweetness as the sucrose control (see table below; see also U.S. Pat. No. 5,380,541).

| Sweetener or blend | Gram sweetener per unit volume |
|---|---|
| Concentration of sweetener A required to provide the sweetness of the standard control | A |
| Concentration of sweetener B required to provide the sweetness of the standard control | B |
| Concentration of sweeteners in the blend to provide the sweetness of the standard control | A' + B' |
| Sweetness contribution in blend from sweetener A | A'/A × 100 = A% |
| Sweetness contribution in blend from sweetener B | B'/B × 100 = B% |
| % Synergy = 100 − (A' + B') | |

Example 1

A 5% sucrose equivalency value (SEV) sensory test was conducted with a sweetening composition of sucralose and purified rebaudioside A (RA90). The weight ratio of sucralose to RA90 was 90:10.

Synergy testing results were as follows:

| Test sample | Sucralose concentration, g/1000 mL | RA90 concentration, g/1000 mL | Number of panelists | % Synergy |
|---|---|---|---|---|
| Control, 5% sugar SEV | 0.095 | 0.0 | | |
| 90:10 C | 0.0846 | 0.0094 | 30 | 6.49 |
| 90:10 D, 5% sugar SEV | 0.0837 | 0.0093 | 30 | 7.49 |
| 90:10 E | 0.0828 | 0.0092 | 30 | 8.48 |

Example 2

A 5% SEV sensory test was conducted with a sweetening composition of sucralose and RA90. The weight ratio of sucralose to RA90 was 80:20.

Synergy testing results were as follows:

| Test sample | Sucralose concentration, g/1000 mL | RA90 concentration, g/1000 mL | Number of panelists | % Synergy |
|---|---|---|---|---|
| Control, 5% sugar SEV | 0.095 | 0.0 | | |
| 80:20, 5% sugar SEV | 0.0776 | 0.0194 | 30 | 9.13 |

Example 3

A 5% SEV sensory test was conducted with a sweetening composition of sucralose and RA90. The weight ratio of sucralose to RA90 was 30:70.

Synergy testing results were as follows:

| Test sample | Sucralose concentration, g/1000 mL | RA90 concentration, g/1000 mL | Number of panelists | % Synergy |
|---|---|---|---|---|
| Control, 5% sugar SEV | 0.095 | 0.0 | | |
| 30:70, 5% sugar SEV | 0.0347 | 0.0809 | 30 | 27.0 |

Example 4

5% SEV sensory testing was performed using sweetening compositions of sucralose and low rebaudioside/dulcoside (low RD) blends. The weight ratio of sucralose to low RD is shown in the table below.

Synergy testing results were as follows:

| Test sample | Sucralose concentration, g/1000 mL | Low RD concentration, g/1000 mL | Number of panelists | % Synergy |
|---|---|---|---|---|
| Control, 5% sugar SEV | 0.0923 | 0.0 | | |
| 90:10, 5% sugar SEV | 0.0899 | 0.010 | 30 | 0.0 |
| 30:70, 5% sugar SEV | 0.0427 | 0.0996 | 30 | 25.0 |

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A synergistic sweetening composition consisting of:
   sucralose, and
   a purified extract of stevia,
   wherein the weight ratio of sucralose to purified extract of stevia is 30:70; the purified stevia extract comprises 90% rebaudioside A; and the sweetening composition demonstrates 27.0% synergy using a 5% SEV sensory test.

2. The synergistic sweetening composition of claim 1, prepared by methods selected from the group consisting of dry blending, spray drying, agglomeration, wet granulation, compaction, and co-crystallization.

* * * * *